(12) United States Patent
Sainson et al.

(10) Patent No.: US 12,417,530 B2
(45) Date of Patent: *Sep. 16, 2025

(54) SYSTEMS AND METHODS TO PROCESS ELECTRONIC IMAGES TO PROVIDE LOCALIZED SEMANTIC ANALYSIS OF WHOLE SLIDE IMAGES

(71) Applicant: PAIGE.AI, Inc., New York, NY (US)

(72) Inventors: Antoine Sainson, Paris (FR); Brandon Rothrock, New York, NY (US); Razik Yousfi, Brooklyn, NY (US); Patricia Raciti, New York, NY (US); Matthew Hanna, New York, NY (US); Christopher Kanan, Pittsford, NY (US)

(73) Assignee: Paige.AI, Inc., New York, NY (US)

(*) Notice: Subject to any disclaimer, the term of this patent is extended or adjusted under 35 U.S.C. 154(b) by 562 days.

This patent is subject to a terminal disclaimer.

(21) Appl. No.: 17/813,651

(22) Filed: Jul. 20, 2022

(65) Prior Publication Data

US 2022/0358650 A1 Nov. 10, 2022

Related U.S. Application Data

(63) Continuation of application No. 17/492,745, filed on Oct. 4, 2021, now Pat. No. 11,430,117, which is a
(Continued)

(51) Int. Cl.
*G06T 7/00* (2017.01)
*G06T 7/11* (2017.01)

(52) U.S. Cl.
CPC .............. *G06T 7/0012* (2013.01); *G06T 7/00* (2013.01); *G06T 7/11* (2017.01);
(Continued)

(58) Field of Classification Search
None
See application file for complete search history.

(56) References Cited

U.S. PATENT DOCUMENTS

| 2020/0302603 A1 | 9/2020 | Barnes et al. |
| 2021/0248418 A1 | 8/2021 | Guo et al. |

FOREIGN PATENT DOCUMENTS

WO 2019172901 A1 9/2019

OTHER PUBLICATIONS

Hou, Le, et al. "Robust histopathology image analysis: To label or to synthesize?." Proceedings of the IEEE/CVF conference on computer vision and pattern recognition. 2019. (Year: 2019).*
(Continued)

*Primary Examiner* — Samah A Beg
(74) *Attorney, Agent, or Firm* — Bookoff McAndrews, PLLC

(57) ABSTRACT

Systems and methods are disclosed for identifying formerly conjoined pieces of tissue in a specimen, comprising receiving one or more digital images associated with a pathology specimen, identifying a plurality of pieces of tissue by applying an instance segmentation system to the one or more digital images, the instance segmentation system having been generated by processing a plurality of training images, determining, using the instance segmentation system, a prediction of whether any of the plurality of pieces of tissue were formerly conjoined, and outputting at least one instance segmentation to a digital storage device and/or display, the instance segmentation comprising an indication of whether any of the plurality of pieces of tissue were formerly conjoined.

20 Claims, 14 Drawing Sheets

Related U.S. Application Data continuation of application No. 17/470,901, filed on Sep. 9, 2021, now Pat. No. 11,430,116.

(60) Provisional application No. 63/086,330, filed on Oct. 1, 2020.

(52) U.S. Cl.
CPC ............. *G06T 2207/10024* (2013.01); *G06T 2207/20081* (2013.01); *G06T 2207/20182* (2013.01); *G06T 2207/30024* (2013.01)

(56) References Cited

OTHER PUBLICATIONS

Apou, Grégory, et al. "Synthesizing whole slide images." 2015 9th International Symposium on Image and Signal Processing and Analysis (ISPA). IEEE, 2015. (Year: 2015).*
Xu, Yan, et al. "Gland instance segmentation using deep multichannel neural networks." IEEE Transactions on Biomedical Engineering 64.12 (2017): 2901-2912. (Year: 2017).
Hou, Le, et al. "Unsupervised histopathology image synthesis." arXiv preprint arXiv: 1712.05021 (2017). (Year: 2017).
Tellez, David, et al. "Neural image compression for gigapixel histopathology image analysis." IEEE transactions on pattern analysis and machine intelligence (2019). (Year: 2019).

* cited by examiner

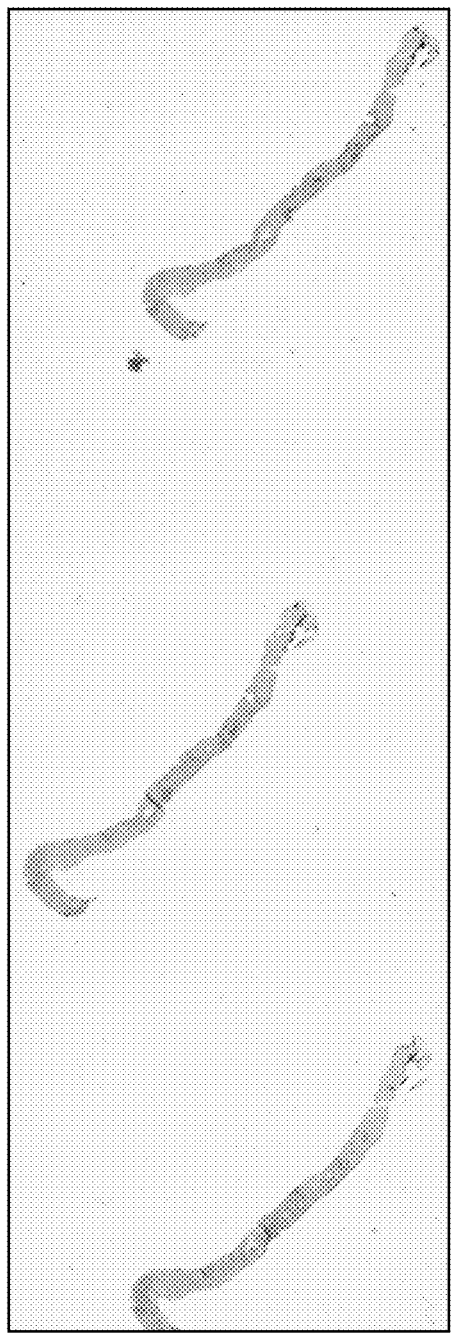
FIG. 7A
FIG. 7B

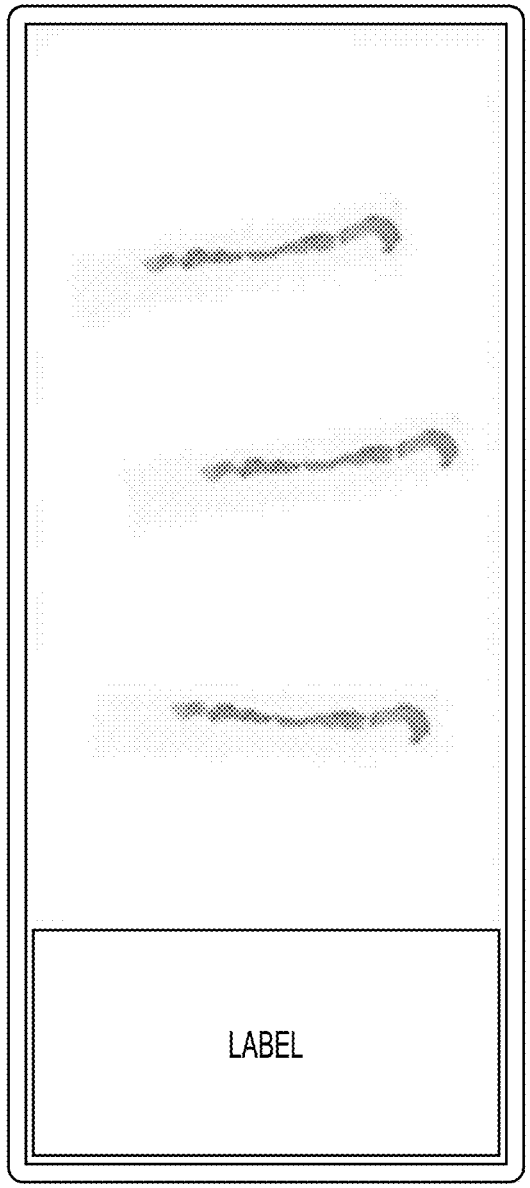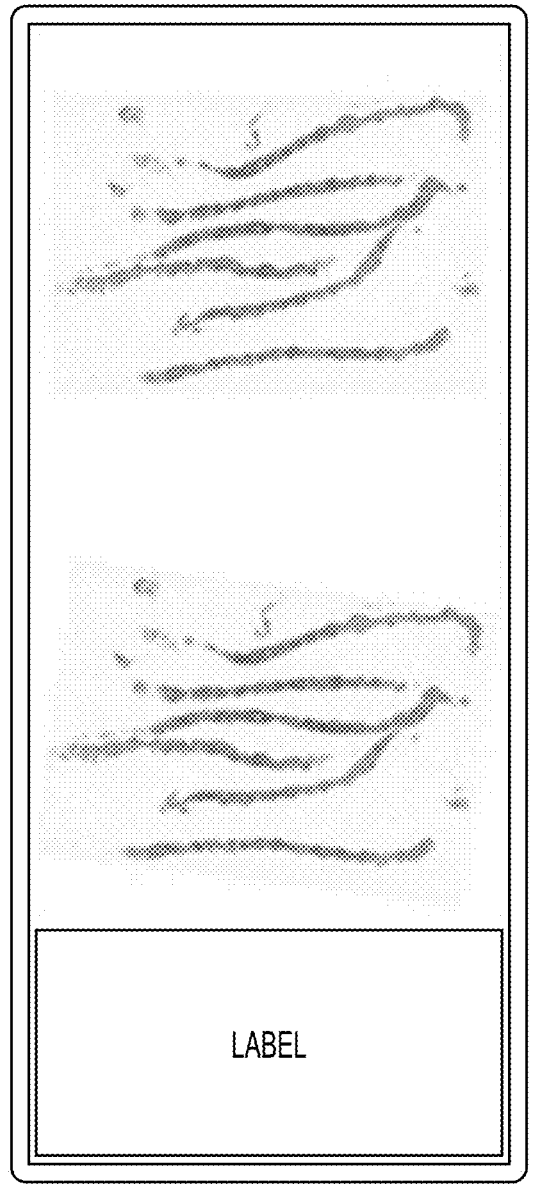
FIG. 8A
FIG. 8B

SYSTEMS AND METHODS TO PROCESS ELECTRONIC IMAGES TO PROVIDE LOCALIZED SEMANTIC ANALYSIS OF WHOLE SLIDE IMAGES

RELATED APPLICATION(S)

This application is a continuation of U.S. Nonprovisional patent application Ser. No. 17/492,745, filed on Oct. 4, 2021, which is a continuation of U.S. Nonprovisional patent application Ser. No. 17/470,901, filed on Sep. 9, 2021, which claims priority to U.S. Provisional Application No. 63/086,330, filed Oct. 1, 2020, each of which are incorporated herein by reference in their entireties.

FIELD OF THE DISCLOSURE

Various embodiments of the present disclosure pertain generally to image processing methods. More specifically, particular embodiments of the present disclosure relate to systems and methods for using artificial intelligence (AI) to extract localized semantic regions to be identified in whole slide images, based on processing images of tissue specimens.

BACKGROUND

Computational pathology combines artificial intelligence (AI) with images of pathology specimens to extract insights and to augment pathologists. However, merely classifying a slide to indicate the presence or absence of disease and/or its severity may not be sufficient for capturing many of the tasks in which pathologists engage.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for identifying formerly conjoined pieces of tissue in a specimen.

A method for identifying formerly conjoined pieces of tissue in a specimen, the method comprising receiving one or more digital images associated with a pathology specimen, identifying a plurality of pieces of tissue by applying an instance segmentation system to the one or more digital images, the instance segmentation system having been generated by processing a plurality of training images, determining, using the instance segmentation system, a prediction of whether any of the plurality of pieces of tissue were formerly conjoined, and outputting at least one instance segmentation to a digital storage device and/or display, the instance segmentation comprising an indication of whether any of the plurality of pieces of tissue were formerly conjoined.

A system for identifying formerly conjoined pieces of tissue in a specimen, the system comprising receiving one or more digital images associated with a pathology specimen, identifying a plurality of pieces of tissue by applying an instance segmentation system to the one or more digital images, the instance segmentation system having been generated by processing a plurality of training images, determining, using the instance segmentation system, a prediction of whether any of the plurality of pieces of tissue were formerly conjoined, and outputting at least one instance segmentation to a digital storage device and/or display, the instance segmentation comprising an indication of whether any of the plurality of pieces of tissue were formerly conjoined.

A non-transitory computer-readable medium storing instructions that, when executed by a processor, cause the processor to perform a method for identifying formerly conjoined pieces of tissue in a specimen, the method including receiving one or more digital images associated with a pathology specimen, identifying a plurality of pieces of tissue by applying an instance segmentation system to the one or more digital images, the instance segmentation system having been generated by processing a plurality of training images, determining, using the instance segmentation system, a prediction of whether any of the plurality of pieces of tissue were formerly conjoined, and outputting at least one instance segmentation to a digital storage device and/or display, the instance segmentation comprising an indication of whether any of the plurality of pieces of tissue were formerly conjoined.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7A illustrates an example slide with a single needle core biopsy at three levels, according to techniques presented herein.

FIG. 7B illustrates an example prostate needle core biopsy with tissue breaks, according to techniques presented herein.

FIG. 8A illustrates an example slide with one core needle biopsy with three levels.

FIG. 8B illustrates an example slide with six core needle biopsies sectioned at two levels.

DESCRIPTION OF THE EMBODIMENTS

Figure 1:
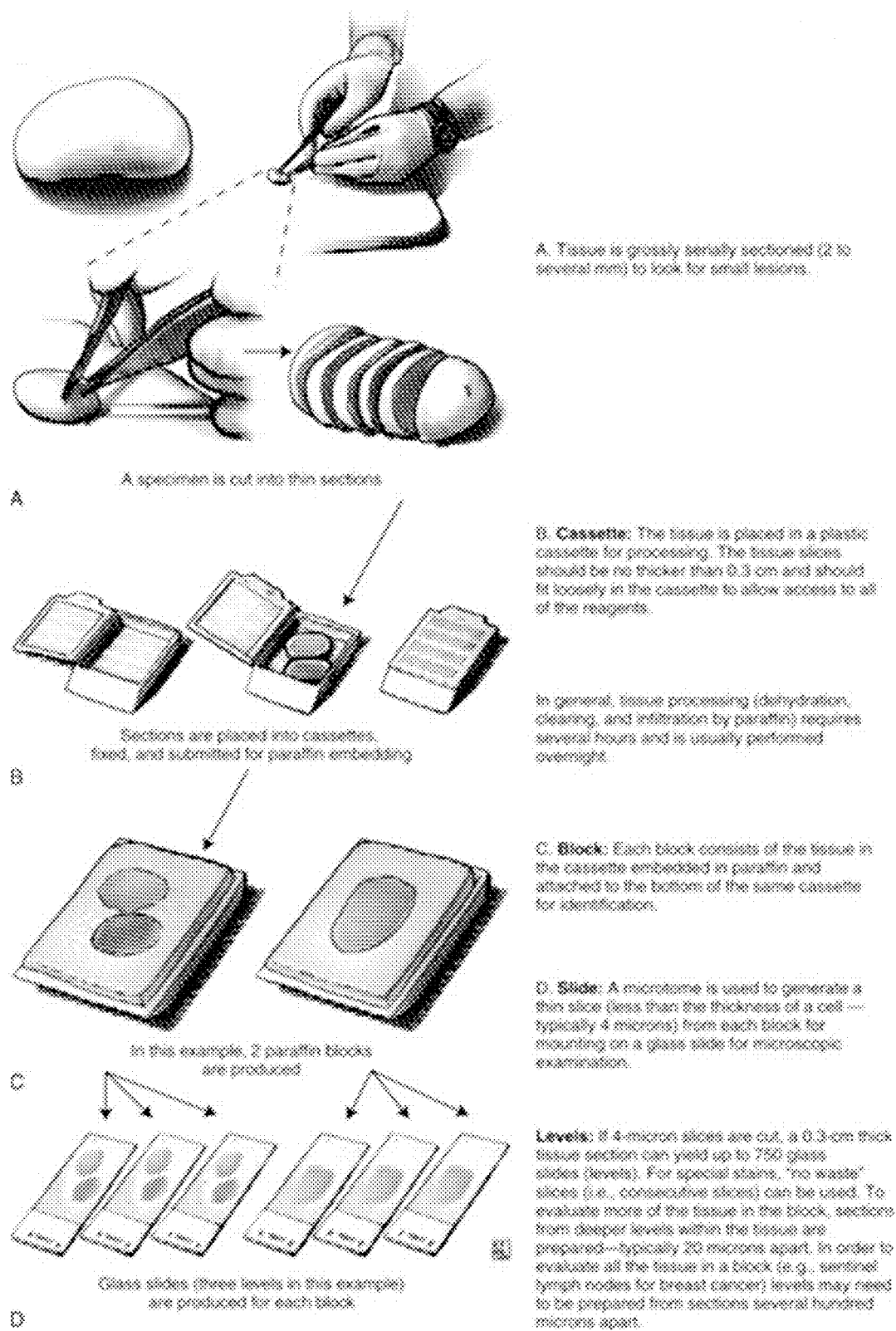
FIG. 1 is an exemplary method of preparing slides with multiple levels.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

One or more embodiments enable the use of AI to extract localized semantic regions to be identified in whole slide images, which facilitates a range of useful tasks pathologists may need to solve: slide quality control, core or level counting in needle biopsies, measurement of tumors and/or other morphological features, localized anomaly and "floater" detection, and more. Techniques presented herein provide for the generation of meaningful synthetic imagery that may improve generalization.

Computational pathology combines artificial intelligence (AI) with images of pathology specimens to extract insights and to augment pathologists. However, merely classifying a slide to indicate the presence or absence of disease and/or its severity may not be sufficient for capturing many of the tasks pathologists engage in. Specifically, recognizing the type of specimen and the semantic grouping of multiple specimens on a slide may enable the automation of several useful tasks that pathologists need to solve. For example, pathologists need to take measurements of tissues that belong together, but that tissue may be broken during processing resulting in a gap between tissue pieces that must be considered as a single entity. The tissue pieces on a slide may be from one sample/biopsy but multiple sections may be laid on a single glass slide (e.g., deeper sections/slices of the same tissue sampled at multiple levels); or the multiple tissue pieces may be from separate samples/biopsies, or a mix of both. An example process of preparing slides with multiple levels or separate biopsies present on the same slide is shown in FIG. 1.

Techniques presented herein may match one or more sections of tissue on the slide with its neighboring sections in order to facilitate numerous downstream tasks such as measurement, counting, and/or visualization. In some embodiments, these pieces may be aligned to facilitate the identification of adjacent levels, a step that may be useful to interpretation of foci which show barely perceptible changes at different levels.

Techniques presented herein may use synthetically generated data to train an instance/panoptic segmentation system for pathology image data. The data synthesis captures the natural variabilities in placement, orientation, and/or overlap of multiple specimens on a slide as well as breaks, tears, or folds in the tissue. This may be accomplished by modifying existing tissue imagery to artificially introduce tears or folds in the tissue. For example, in a core needle biopsy, a gap may be artificially introduced in the tissue in a manner consistent with how tissue naturally breaks apart when prepared. These synthetic cores may then be replicated and placed on an artificial slide, consistent with how multiple levels are prepared from a block in a pathology lab (i.e. multiple slices from a 3D tissue volume are placed side-by-side on a slide).

The use of synthetic data allows the panoptic segmentation model to generalize to these natural variabilities without having to physically observe and/or manually annotate these samples. The resulting model may then identify the type of specimen (i.e. resection or biopsy), associate the fragments of torn or separated tissue that belong together, as well as provide a correspondence for different sectioned levels of the same specimen placed on the same slide. These capabilities provide efficiencies to multiple tasks that pathologists may need to perform, such as core counting, identifying floaters (i.e. foreign tissue from potentially another patient), and/or simultaneous review of multiple levels by displaying corresponding regions of interest across all or multiple levels.

Figure 2A:
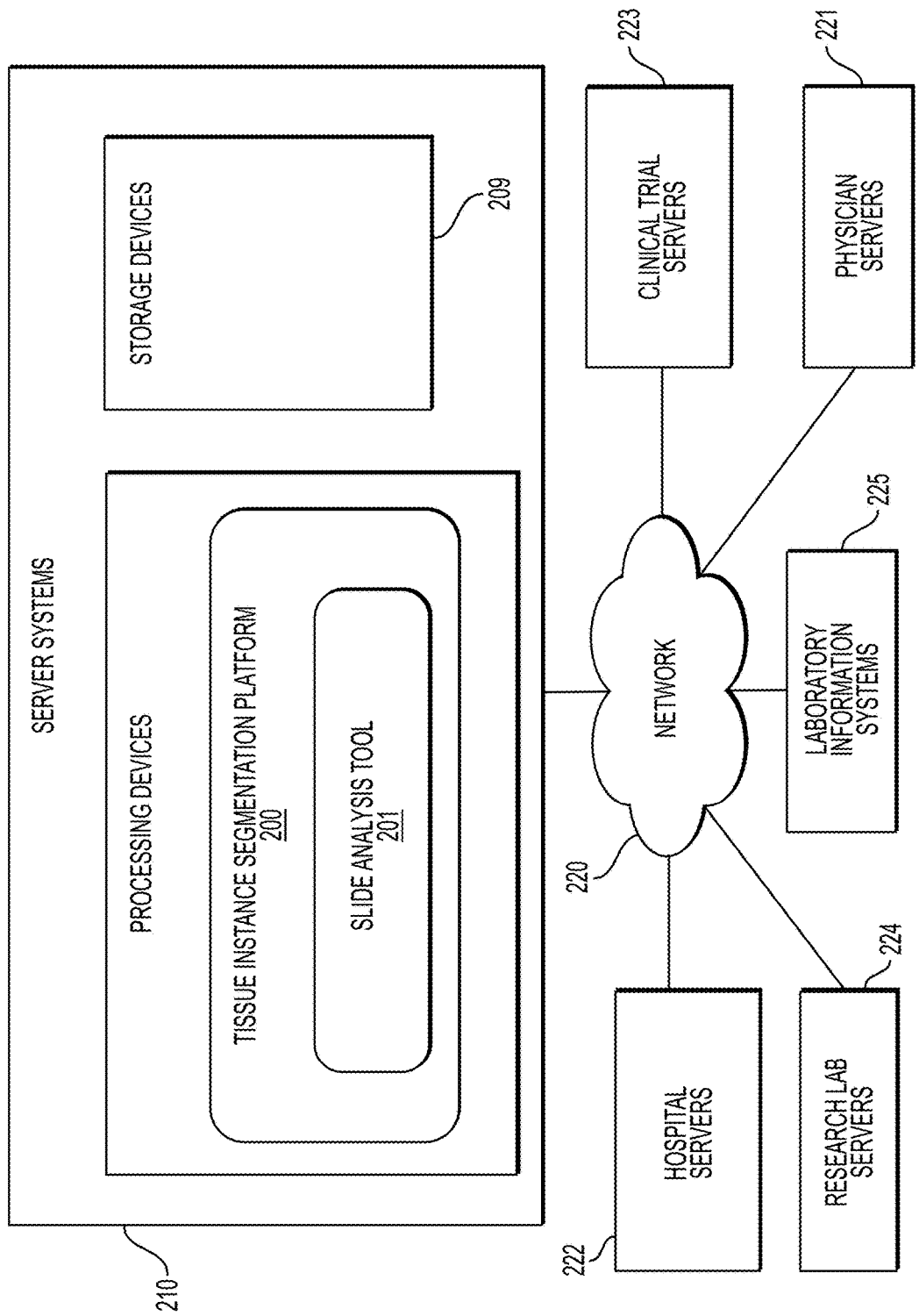
FIG. 2A illustrates an exemplary block diagram of a system and network for identifying pieces of tissue that belong together in a specimen, according to techniques presented herein.

FIG. 2A illustrates a block diagram of a system and network for identifying pieces of tissue that belong together in a specimen, using machine learning, according to an exemplary embodiment of the present disclosure.

Specifically, FIG. 2A illustrates an electronic network 220 that may be connected to servers at hospitals, laboratories, and/or doctors' offices, etc. For example, physician servers 221, hospital servers 222, clinical trial servers 223, research lab servers 224, and/or laboratory information systems 225, etc., may each be connected to an electronic network 220, such as the Internet, through one or more computers, servers, and/or handheld mobile devices. According to an exemplary embodiment of the present disclosure, the electronic network 220 may also be connected to server systems 210, which may include processing devices that are configured to implement a tissue instance segmentation platform 200, which includes a slide analysis tool 201 for determining specimen property or image property information pertaining to digital pathology image(s), and using machine learning to classify a specimen, according to an exemplary embodiment of the present disclosure.

The physician servers 221, hospital servers 222, clinical trial servers 223, research lab servers 224, and/or laboratory information systems 225 may create or otherwise obtain images of one or more patients' cytology specimen(s), histopathology specimen(s), slide(s) of the cytology specimen(s), digitized images of the slide(s) of the histopathology specimen(s), or any combination thereof. The physician servers 221, hospital servers 222, clinical trial servers 223, research lab servers 224, and/or laboratory information systems 225 may also obtain any combination of patient-specific information, such as age, medical history, cancer treatment history, family history, past biopsy or cytology information, etc. The physician servers 221, hospital servers 222, clinical trial servers 223, research lab servers 224, and/or laboratory information systems 225 may transmit digitized slide images and/or patient-specific information to server systems 210 over the electronic network 220. Server systems 210 may include one or more storage devices 209 for storing images and data received from at least one of the physician servers 221, hospital servers 222, clinical trial servers 223, research lab servers 224, and/or laboratory information systems 225. Server systems 210 may also include processing devices for processing images and data stored in the one or more storage devices 209. Server systems 210 may further include one or more machine learning tool(s) or capabilities. For example, the processing devices may include a machine learning tool for a tissue instance segmentation platform 200, according to one embodiment. Alternatively or in addition, the present disclosure (or portions of the system and methods of the present disclosure) may be performed on a local processing device (e.g., a laptop).

The physician servers 221, hospital servers 222, clinical trial 223, research lab servers 224, and/or laboratory information systems 225 refer to systems used by pathologists for reviewing the images of the slides. In hospital settings, tissue type information may be stored in one of the laboratory information systems 225. However, the correct tissue classification information is not always paired with the image content. Additionally, even if a laboratory information system is used to access the specimen type for a digital pathology image, this label may be incorrect due to the face that many components of a laboratory information system may be manually input, leaving a large margin for error. According to an exemplary embodiment of the present disclosure, a specimen type may be identified without needing to access the laboratory information systems 225, or may be identified to possibly correct laboratory information systems 225. For example, a third party may be given anonymized access to the image content without the corresponding specimen type label stored in the laboratory information system. Additionally, access to laboratory information system content may be limited due to its sensitive content.

Figure 2B:
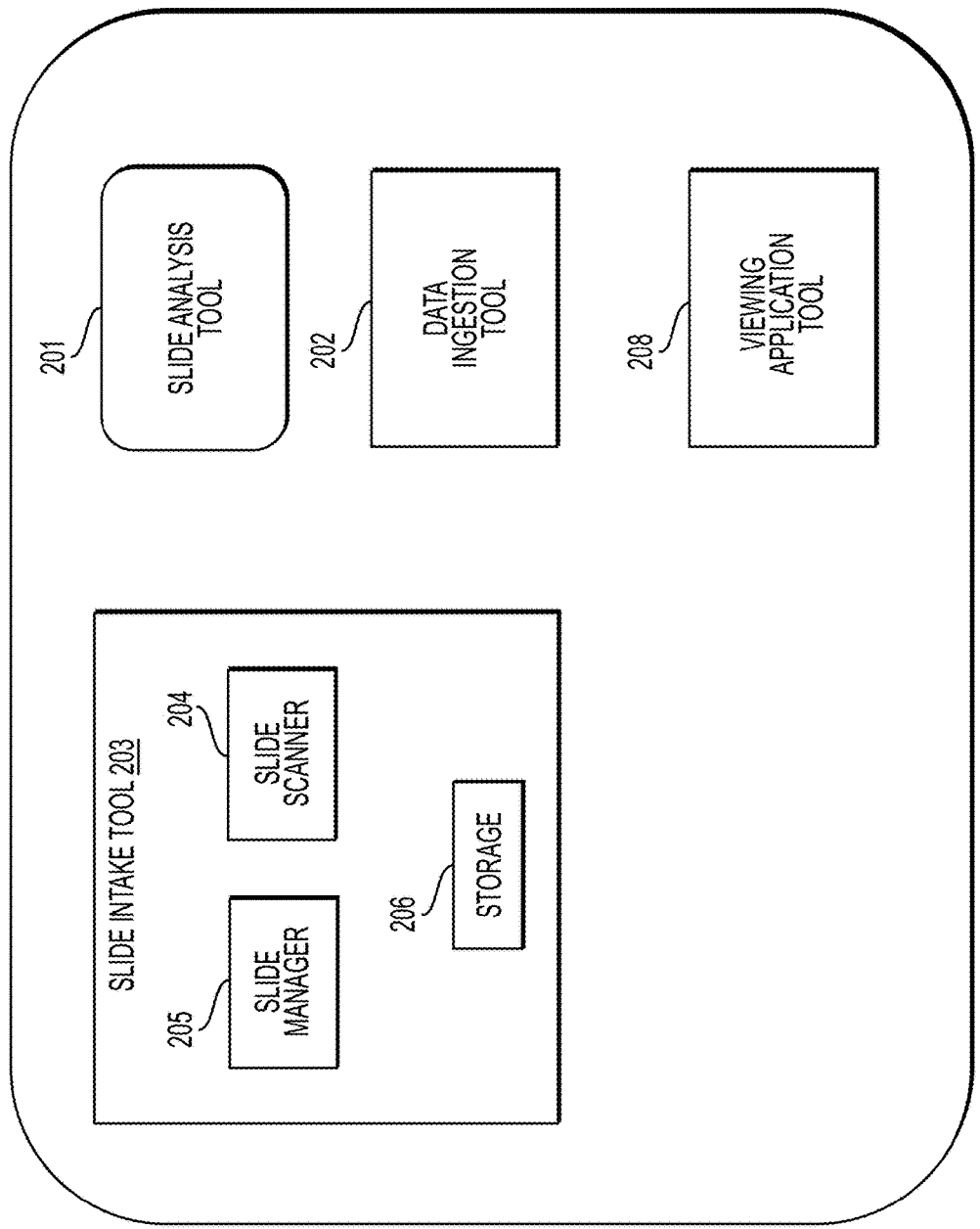
FIG. 2B illustrates an exemplary block diagram of a tissue instance segmentation system, according to techniques presented herein.

FIG. 2B illustrates an exemplary block diagram of a tissue instance segmentation platform 200 for determining specimen property of image property information pertaining to digital pathology image(s), using machine learning. For example, the tissue instance segmentation platform 200 may include a slide analysis tool 201, a data ingestion tool 202, a slide intake tool 203, a slide scanner 204, a slide manager 205, a storage 206, and a viewing application tool 208.

The slide analysis tool 201, as described below, refers to a process and system for processing digital images associated with a tissue specimen, and using machine learning to analyze a slide, according to an exemplary embodiment.

The data ingestion tool 202 refers to a process and system for facilitating a transfer of the digital pathology images to the various tools, modules, components, and devices that are used for classifying and processing the digital pathology images, according to an exemplary embodiment.

The slide intake tool 203 refers to a process and system for scanning pathology images and converting them into a digital form, according to an exemplary embodiment. The slides may be scanned with slide scanner 204, and the slide manager 205 may process the images on the slides into digitized pathology images and store the digitized images in storage 206.

The viewing application tool 208 refers to a process and system for providing a user (e.g., a pathologist) with specimen property or image property information pertaining to digital pathology image(s), according to an exemplary embodiment. The information may be provided through various output interfaces (e.g., a screen, a monitor, a storage device, and/or a web browser, etc.).

The slide analysis tool 201, and each of its components, may transmit and/or receive digitized slide images and/or patient information to server systems 210, physician servers 221, hospital servers 222, clinical trial servers 223, research lab servers 224, and/or laboratory information systems 225 over an electronic network 220. Further, server systems 210 may include one or more storage devices 209 for storing images and data received from at least one of the slide analysis tool 201, the data ingestion tool 202, the slide intake tool 203, the slide scanner 204, the slide manager 205, and viewing application tool 208. Server systems 210 may also include processing devices for processing images and data stored in the storage devices. Server systems 210 may further include one or more machine learning tool(s) or capabilities, e.g., due to the processing devices. Alternatively or in addition, the present disclosure (or portions of the system and methods of the present disclosure) may be performed on a local processing device (e.g., a laptop).

Any of the above devices, tools and modules may be located on a device that may be connected to an electronic network 220, such as the Internet or a cloud service provider, through one or more computers, servers, and/or handheld mobile devices.

Figure 2C:
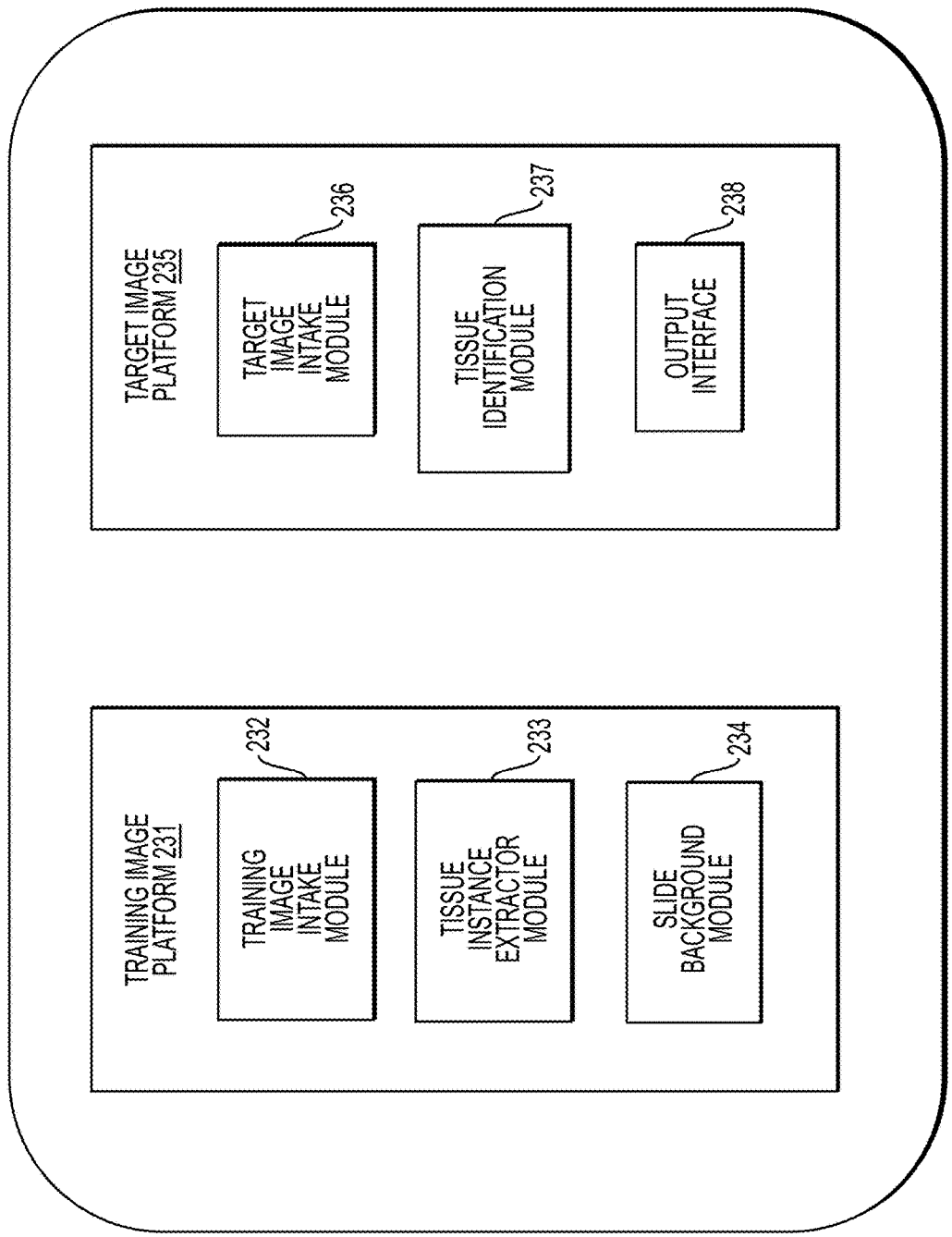
FIG. 2C illustrates an exemplary block diagram of a slide analysis tool, according to techniques presented herein.

FIG. 2C illustrates an exemplary block diagram of a slide analysis tool 201, according to an exemplary embodiment of the present disclosure. The slide analysis tool may include a training image platform 231 and/or a target image platform 235.

The training image platform 231, according to one embodiment, may create or receive training images that are used to train a machine learning system to effectively analyze and classify digital pathology images. For example, the training images may be received from any one or any combination of the server systems 210, physician servers 221, hospital servers 222, clinical trial servers 223, research lab servers 224, and/or laboratory information systems 225.

Images used for training may come from real sources (e.g., humans, animals, etc.) or may come from synthetic sources (e.g., graphics rendering engines, 3D models, etc.). Examples of digital pathology images may include (a) digitized slides stained with a variety of stains, such as (but not limited to) H&E, Hematoxylin alone, IHC, molecular pathology, etc.; and/or (b) digitized image samples from a 3D imaging device, such as microCT.

The training image intake 232 may create or receive a dataset comprising one or more training images corresponding to either or both of images of a human tissue and images that are graphically rendered. For example, the training images may be received from any one or any combination of the server systems 210, physician servers 224, and/or laboratory information systems 225. This dataset may be kept on a digital storage device. The tissue instance extractor module 233 may identify tissue instances within training images that may greatly affect the usability of a digital pathology image. For example, the tissue instance extractor module may use information about an entire image, e.g., the specimen type, the overall quality of the specimen, the overall quality of the glass pathology slide itself or tissue morphology characteristics, and determine the number of tissue instances to extract. The slide background module 234 may analyze images of tissues and determine a background within a digital pathology image. It is useful to identify a background within a digital pathology slide to ensure tissue segments are not overlooked.

According to one embodiment, the target image platform 235 may include a target image intake module 236, a tissue identification module 237, and an output interface 238. The target image platform 235 may receive a target image and apply the machine learning model to the received target image to determine a characteristic of a target specimen. For example, the target image may be received from any one or any combination of the server systems 210, physician servers 221, hospital servers 222, clinical trial servers 223, research lab servers 224, and/or laboratory information systems 225. The target image intake module 236 may receive a target image corresponding to a target specimen. The tissue identification module 237 may apply the machine learning model to the target image to determine a characteristic of the target specimen. For example, the tissue identification module 237 may apply the machine learning model to the target image to determine a characteristic of the target specimen. For example, the tissue identification module 237 may detect a specimen type of the target specimen. The tissue identification module 237 may also apply the machine learning model to the target image to determine a quality score for the target image. Further, the tissue identification module may apply the machine learning model to the target specimen to determine whether the target specimen is pretreatment or post-treatment.

The output interface 238 may be used to output information about the target image and the target specimen (e.g., to a screen, monitor, storage device, web browser, etc.).

Figure 3A:
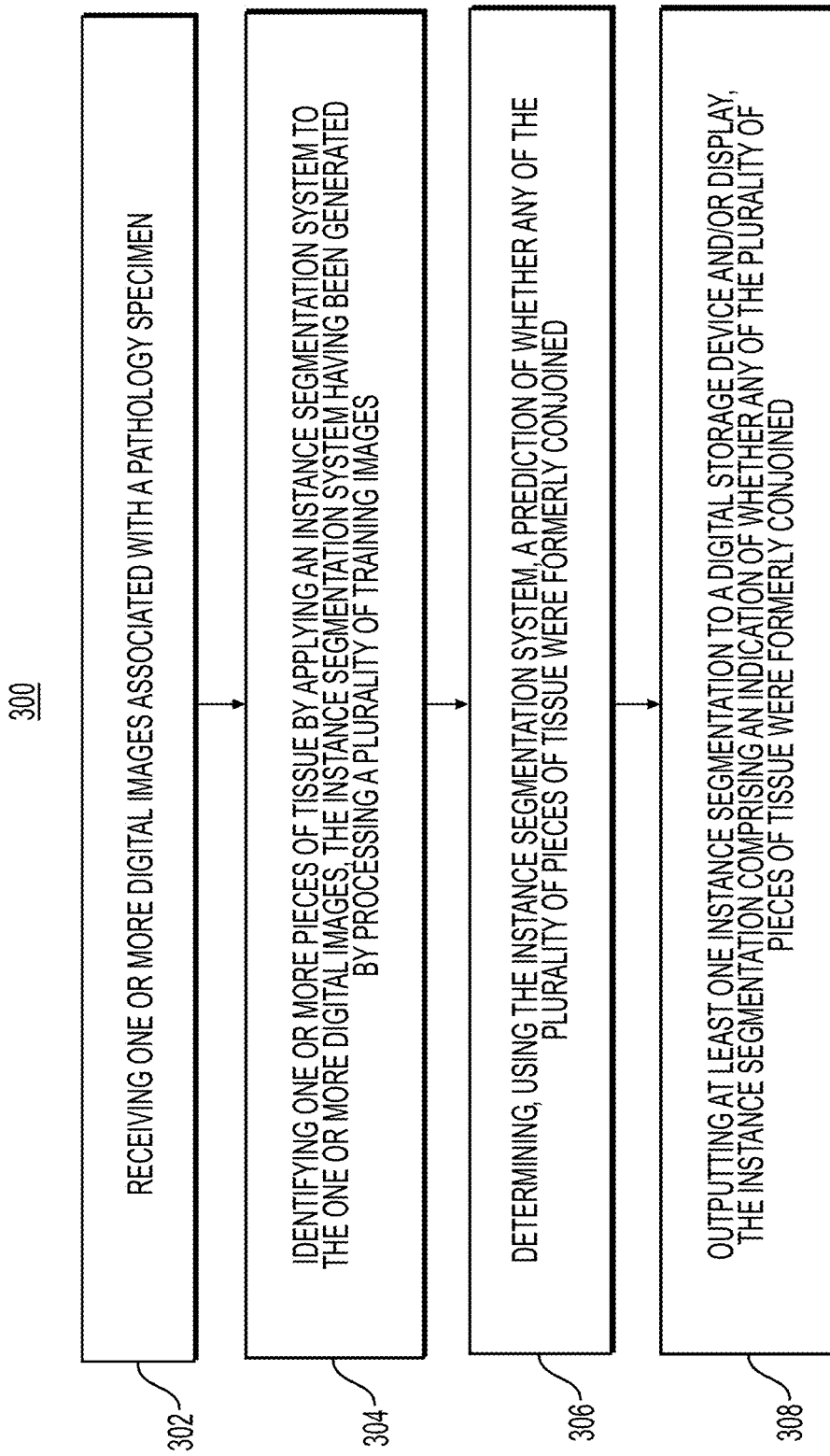
FIG. 3A is a flowchart illustrating an exemplary method for using a tissue instance segmentation system, according to techniques presented herein.

FIG. 3A is a flowchart illustrating an exemplary method for using a tissue instance segmentation system, according to an exemplary embodiment of the present disclosure. The method may be used to identify pieces of tissue that belong together, are associated with each other, are (or were originally/formerly) contiguous, conjoined, etc. For example, an exemplary method 300 (e.g., steps 302-308) may be performed by the slide analysis 201 automatically or in response to a request from a user (e.g., physician, pathologist, etc.).

According to one embodiment, the exemplary method 300 for using a tissue instance segmentation system may include one or more of the following steps. In step 302, the method may include receiving one or more digital images associated with a pathology specimen (e.g., histology, cytology, etc.), for example from a digital storage device (e.g., hard drive, network drive, cloud storage, RAM, etc.).

In step 304, the method may include identifying a plurality of pieces of tissue by applying an instance segmentation system to the one or more digital images, the instance segmentation system having been generated by processing a plurality of training images.

In step 306, the method may include determining, using the instance segmentation system, a prediction of whether any of the plurality of pieces of tissue were formerly conjoined.

In step 308, the method may include outputting at least one instance segmentation to a digital storage device (e.g., hard drive, cloud storage, etc.), and/or to a display, etc., the instance segmentation comprising an indication of whether any of the plurality of pieces of tissue were formerly conjoined.

Figure 3B:
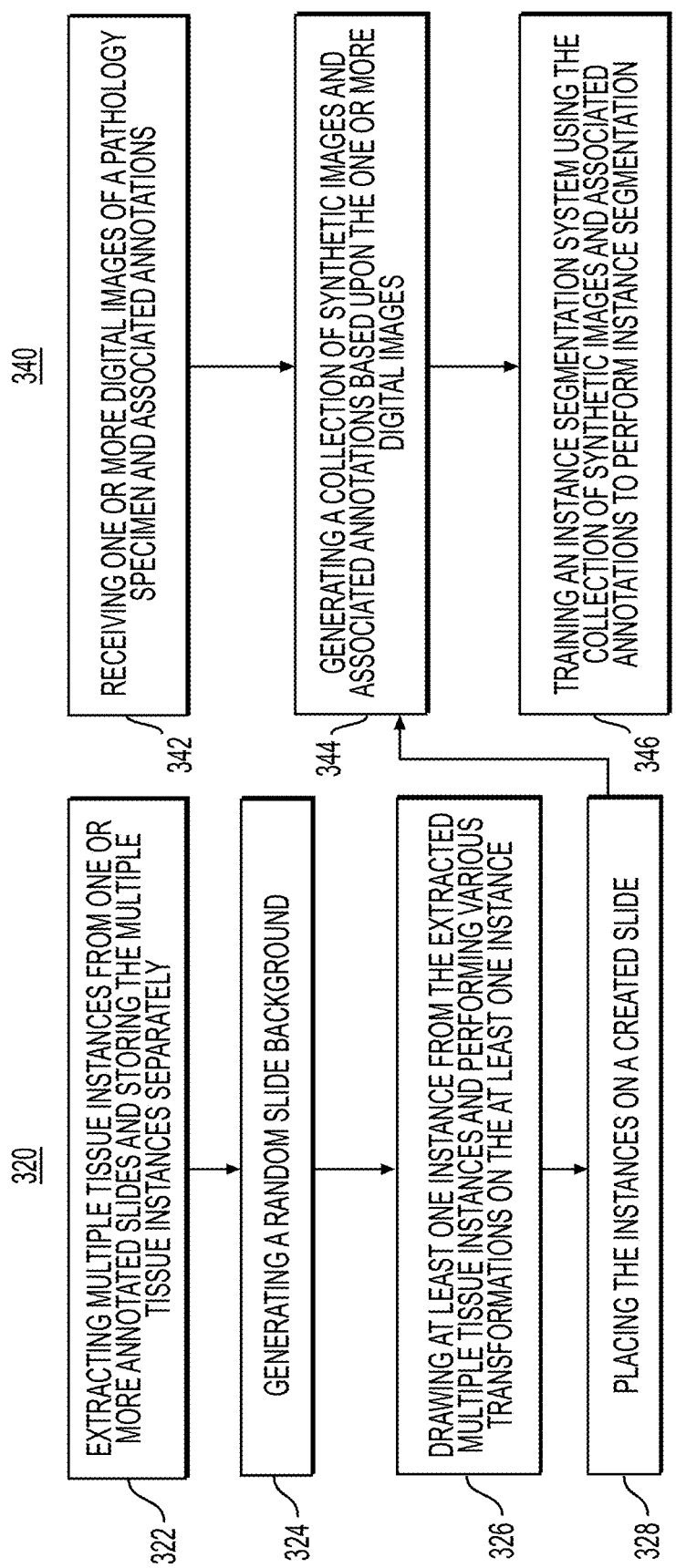
FIG. 3B is a flowchart illustrating an exemplary method for training a tissue instance segmentation system, according to techniques presented herein.

FIG. 3B is a flowchart illustrating an exemplary method for training a tissue instance segmentation system, according to techniques presented herein. Because annotating data takes time, embodiments may utilize existing annotated training data to create new layouts for biopsies and/or excisions. Using this approach greatly increases the amount of training data, enables systems to perform better, and improves generalization.

Synthetic image generation may have three steps: 1) background generation, 2) artifact and floater embedding, and/or 3) embedding levels or cores in random orientations and positions. For example, exemplary methods 320 (steps 322-326) and 340 (steps 342-346) may be performed by slide analysis tool 201 automatically or in response to a request from a user.

According to one embodiment, the exemplary method 320 for training a tissue instance segmentation system may include one or more of the following steps. In step 322, the method may include extracting multiple tissue instances from one or more annotated slides and storing the multiple tissue instances separately. One or more tissue cores may be stored as a Red Blue Green (RBG) image with black pixels for background, and/or directly as polygon coordinates.

In step 324, the method may include generating a random slide background by sampling from a background distribution. Generation may also be accomplished through picking a random resolution, number of cores, and/or noise distribution. The background slide may be created using these parameters. Noise distribution may include but is not limited to: Gaussian noise, salt-and-pepper noise, periodic noise, etc.

In step 326, the method may include drawing at least one instance from the extracted multiple tissue instances of step 322, and performing various transformations on the multiple tissue instances. Transformations may include rotation, scaling, warping, brightness, etc.

In step 328, the method may include placing the instances on a created slide. The placement may be random, or pseudo random, using heuristics to reproduce common patterns, or avoid certain configurations (e.g., overlapping of instances).

Method 340 of training a tissue instance segmentation system may include the following steps. In step 342, the method may include receiving one or more digital images associated with a pathology specimen (e.g., histology, cytology, etc.) and associated annotations into a digital storage device (e.g., hard drive, network drive, cloud storage, RAM, etc.). Annotations may be specified as a pixel mask, using polygons, etc.

In step 344, the method may include generating a collection of synthetic images and associated annotations, using method 320 as explained above.

In step 346, the method may include training an instance segmentation system using the generated collection of synthetic images to perform instance segmentation. The system may use, but is not limited to: Mask Region Convolutional Neural Network (Mask R-CNN), Deep Mask, PolyTransform, Detection Transformers (DETR), etc.

Figure 4A:
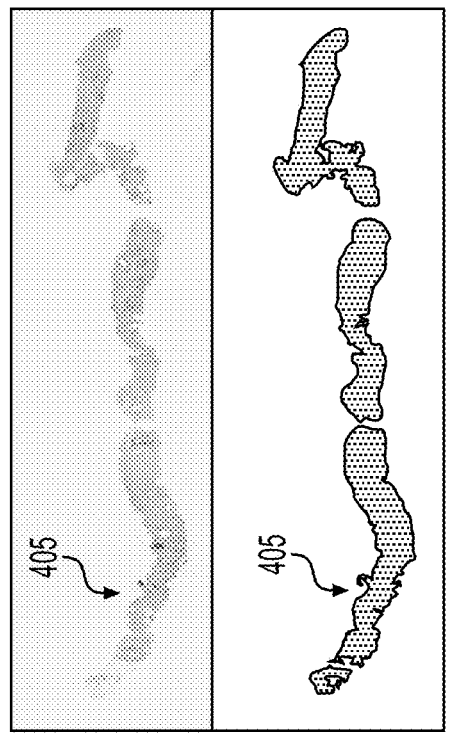
FIG. 4A illustrates an example biopsy tissue slide image and an instance segmentation annotation of the same biopsy tissue slide image, according to techniques presented herein.
Figure 4B:
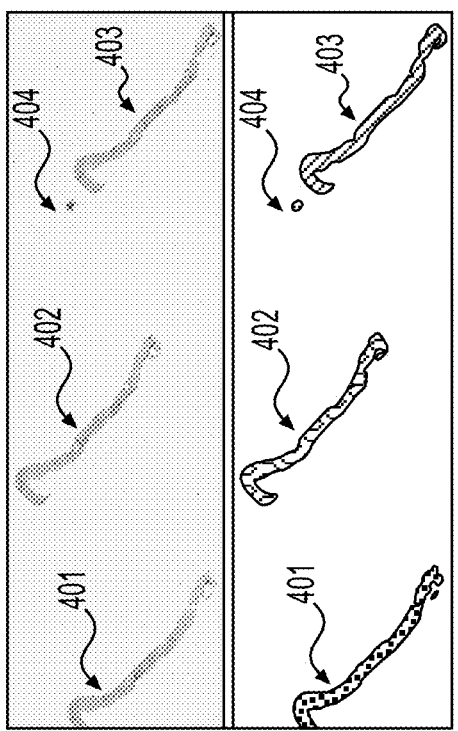
FIG. 4B illustrates an example of a digital pathology slide and an instance segmentation annotation of the same digital pathology slide, according to techniques presented herein.
Figure 4C:
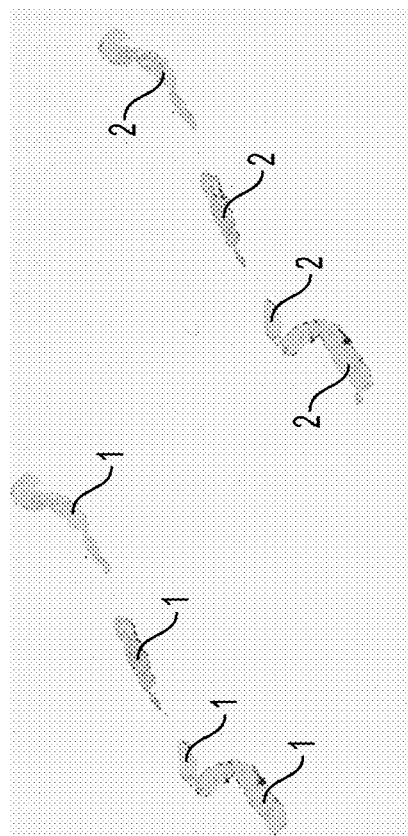
FIG. 4C illustrates an example of a point-based annotated tissue, prepared according to techniques presented herein.

An exemplary embodiment of training a tissue instance segmentation system for prostate need core biopsies is depicted in FIGS. 4A-4C. Some of the steps for generating a prostate core needle biopsy image for training may be optional.

Annotations

Techniques presented herein may use annotations for training, but rather than solely using human-generated annotations it may use these annotations to generate additional synthetic annotations. The manual annotations may indicate the kind of tissue and which pieces of tissue should constitute a single component. Initial manual annotations may be used from real world data as well as synthetically generated annotations. Indeed, hand annotating data is a long and fastidious process, so synthetic annotations may be used created from the hand annotated data to create a large amount of already annotated slides.

Annotations may be specified in one or more of multiple ways:
1. One or more polygons that indicate a grouped region of interest, e.g., a biopsy, a lymph node, etc. One or more polygons may be associated with a category and/or an identity that indicates which polygons belong together.
2. One or more pixel masks that indicate which indicate regions of interest, e.g., a biopsy, a lymph node, etc. One or more masks or a specific value within a mask may be associated with a category and/or an identity that indicates which polygons belong together. For example, a mask for biopsy tissue may use a 1 to indicate one of the biopsies on the WSI and a 2 may indicate a different biopsy.
3. One or more point labels that indicate which regions belong together and their category, which may then be expanded using computer vision or image processing techniques such as unsupervised segmentation/clustering followed by thresholding and the use of morphological operations. This representation may then be converted into a polygon or pixel representation.

Annotations may indicate pieces of tissue that belong together, and they may also be used to identify foreign tissue that may be unlikely to be from the patient, which may be called a "floater."

FIG. 4A illustrates three views of a digital pathology slide with tissues 401-403 (top image) and an instance segmentation annotation of the same digital pathology slide with tissues 401-403 (bottom image). In the instance segmentation annotation, possible floater tissue 404 is indicated in white. Shaded tissues indicate distinct contiguous levels of the biopsy tissue, despite gaps in the leftmost tissue.

FIG. 4B illustrates a view of a digital pathology slide with tissue 405 (top image) and an instance segmentation annotation of the same digital pathology slide with tissue 405 (bottom image). In the instance segmentation annotation, the white tissue 405 indicating a contiguous region that belongs together despite the gaps in the tissue.

FIG. 4C illustrates an example of a point-based annotated tissue, prepared according to techniques presented herein. Here, the annotator has selected points on the tissue to indicate that each "1" or "2" label belongs to the same needle core biopsy. Once selected, unsupervised segmentation methods (e.g., k-means, graph cuts, thresholding to remove the background, etc.) may be used to isolate clusters of tissue and then the same instance label may be assigned to each piece of tissue, despite the tissues being disconnected.

Embodiment: Sample Type or Tissue Type Presence

Cancer detection or grading models may use as input histopathology slides of the organ to analyze. Using a breast slide as input for a prostate cancer detection model may cause errors in diagnosis and confuse the user. Hence, it may be necessary to ensure that the model is run on the right kind of data, by raising a flag if the slide used as input is suspicious. If two types of tissues are detected on the same slide, it may also raise a flag for floaters detection, i.e. piece of tissue coming from another tissue sample on a slide.

For training:
1. Receive the dataset of digital images of slides for a patient into a digital storage device (e.g., hard drive, network drive, cloud storage, RAM, etc.). One or more images may need to be annotated. Use images from various organs without core annotations.
2. Add one or more preprocessing steps to one or more images. For example: noise reduction, contrast enhancement, etc.
3. Split the dataset in validation and training.
4. Train the model.

For use—Extracting Diagnostic Information:
1. Receive one or more digital images of slides for a patient into a digital storage device (e.g., hard drive, network drive, cloud storage, RAM, etc.).
2. Run the trained semantic segmentation system on one or more slides to generate labeled cores/levels, artifacts, and/or background.
3. If at least one core prediction is found with enough confidence, the slide is not flagged as suspicious. However, if there are no predictions for cores on the input slide, it may be considered out of distribution.

Figure 5:
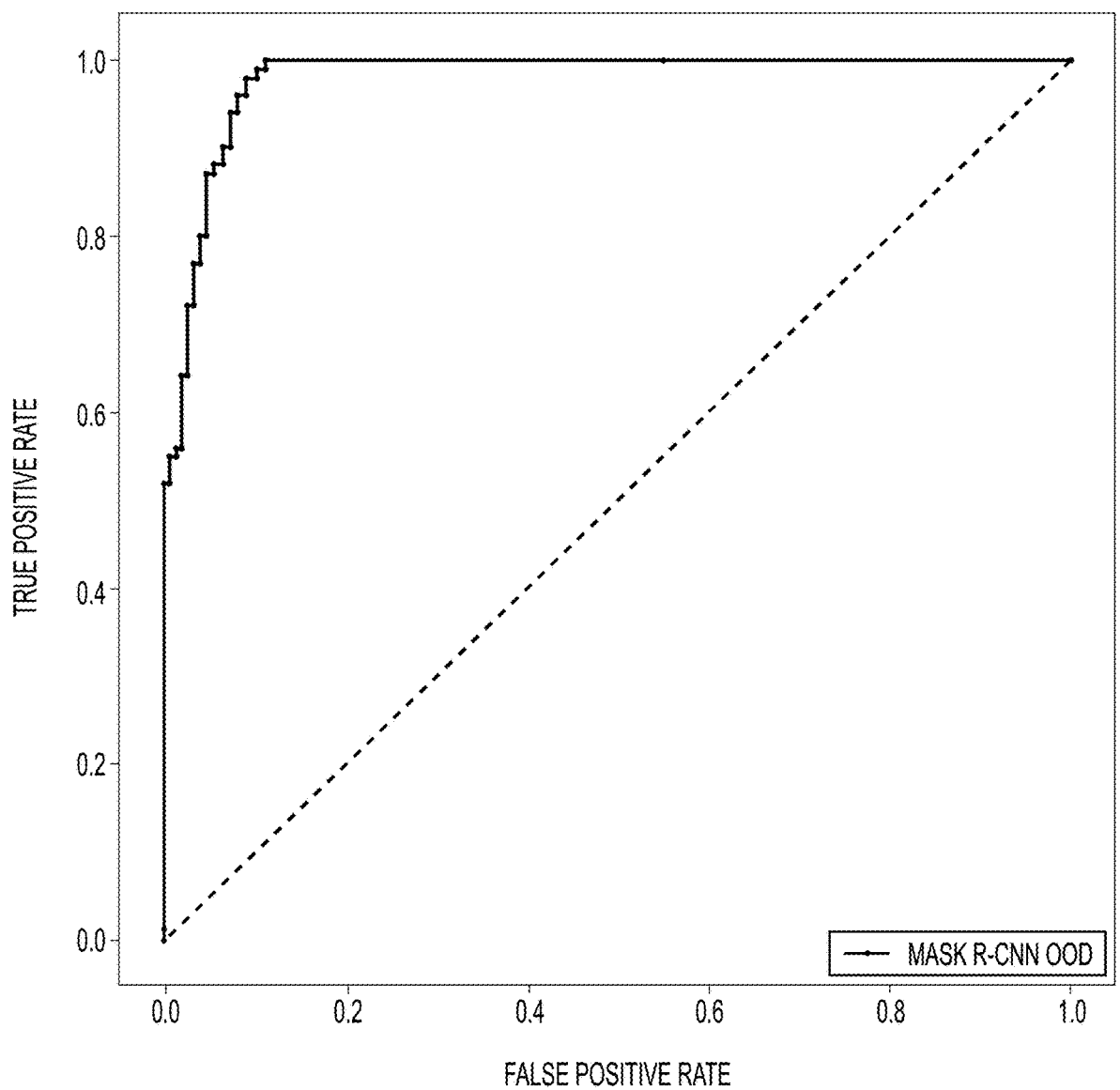
FIG. 5 illustrates a receiving operating characteristic (ROC) Curve of a suspicious slide detection experiment, according to techniques presented herein.

In an embodiment of this capability, on a validation dataset containing 250 histopathology slides from prostate, bladder, breast, and/or lymph nodes, 89.3% specificity and 100% sensitivity was achieved. The results are shown in FIG. 5, illustrating a receiver operating characteristic (ROC) Curve of the suspicious slide detection experiment.

Embodiment: Segmentation of Prostate Core Needle Biopsies for Property Measurements Prostate cancer may be diagnosed by taking multiple needle core biopsies of the prostate organ. Each core may need to be individually assessed for cancer presence and measurements of the disease extent and grade may need to be taken if it is present for all cores.

Needle biopsies are typically thin and long regions of tissue, and multiple cores are often present on a single slide. Hence, conventional methods are not applicable for this task, as determining if a part of the image is tissue versus non-tissue may not be enough to obtain successful instance segmentation within a slide. This task may be made even more challenging because there are often breaks within a core, with multiple pieces of the same core on the slide.

Figure 6:
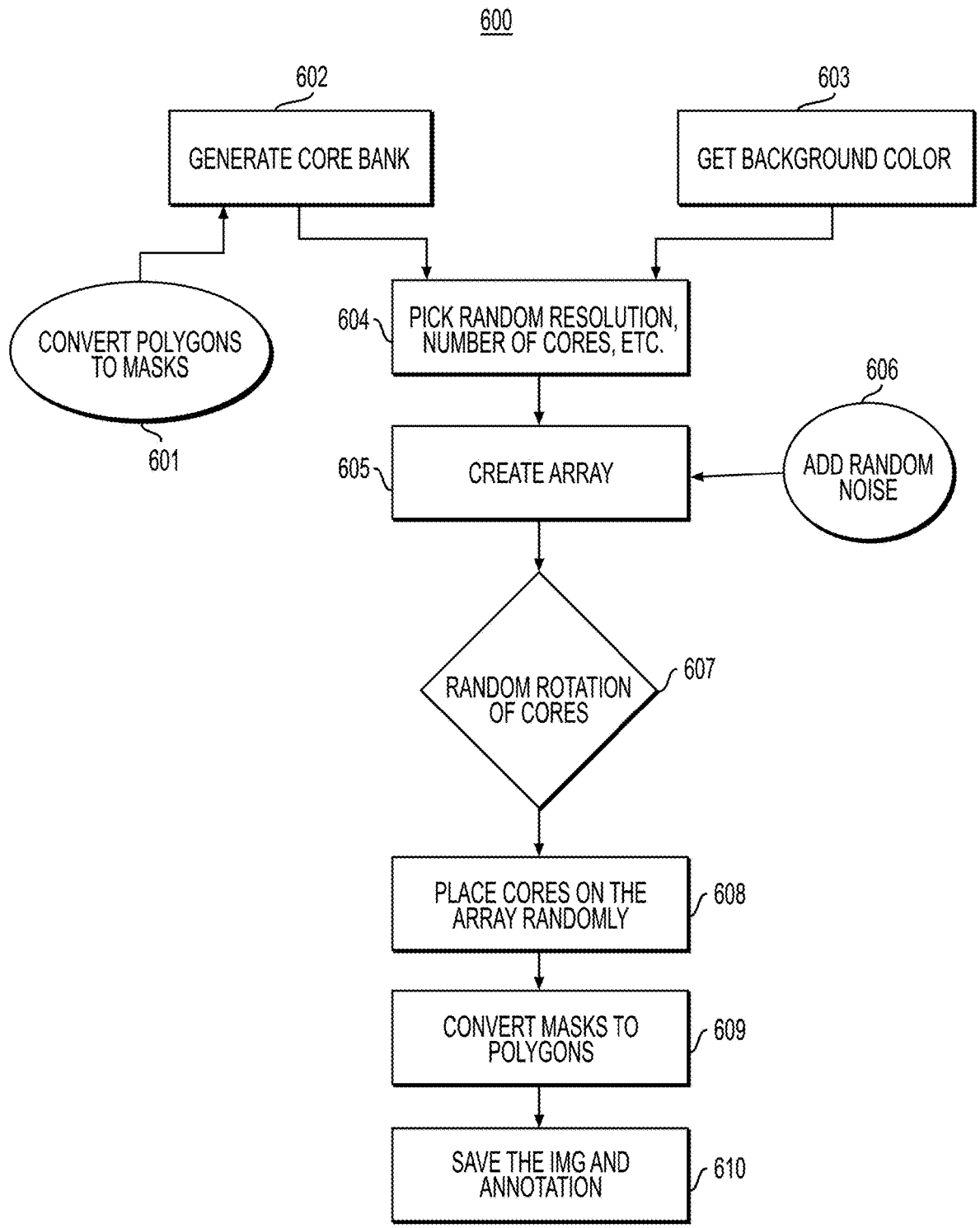
FIG. 6 is a flowchart for generating a synthetic prostate core needle biopsy image for training, according to techniques presented herein.

FIG. 6 illustrates a method for generating a synthetic prostate core needle biopsy image for training. Some of the steps may be optional. Exemplary method 600 (i.e., steps 602-610) may be performed by slide analysis tool 201 automatically or in response to a request from a user.

According to one embodiment, the exemplary method 600 for generating a synthetic prostate core needle biopsy image for training may include one or more of the following steps. In step 601, the method may include converting polygon annotations to masks by utilizing a segmentation model to classify tissue within the polygon from the slide background to produce a pixel-wise mask. Converting the polygon annotations may comprise receiving one or more annotated digital images associate with a pathology specimen. Each annotated digital image may comprise at least one annotation, which may be in the form of a polygon segmenting a distinct region of tissue of the pathology specimen. A tissue mask may be determined based on each polygon annotation, where the tissue mask segments tissue from the slide background.

In step 602, the method may include generating a core bank. The bank of tissue cores may be based on the one or more annotated digital images.

In step 603, the method may include generating a background sample distribution from the slide background. The background sample distribution may represent a statistical distribution of the slide background. Generation of the background sample distribution may include generation of an empty synthetic slide by sampling background or selecting a fixed background color.

In step 604, the method may include drawing a sample from the background distribution. The method may also include randomly placing and/or rotating one or more tissue cores and corresponding tissue mask from the bank of tissue cores.

In step 605, the method may include creating an array.

In step 606, the method may include adding random noise to the array created in step 605.

In step 607, the method may include a random rotation of cores.

In step 608, the method may include placing cores on the array randomly.

In step 609, the method may include converting the corresponding tissue masks into a single annotation mask for the entire empty synthetic slides to generate a synthetic digital image.

In step 610, the method may include saving the image and annotation. The synthetic prostate core needle biopsy image and the associated annotation of the biopsy may be used to train FIG. 7A illustrates an example slide with a single prostate needle core biopsy at three levels.

FIG. 7B illustrates an example prostate needle core biopsy with tissue breaks.

FIGS. 8A and 8B illustrate two example slides, the top with one core needle biopsy with three levels and the bottom with six core needle biopsies sectioned at two levels.

Figure 9:
FIG. 9 illustrates exemplary synthetically generated core needle biopsy images generated by an embodiment of the present disclosure used for training.

Example outputs of the synthetic slide generator are given in FIG. 9. These output images are example synthetically generated core needle biopsy images generated by a prototype used for training.

For Training:
1. Receive the dataset of digital images of slides for a patient into a digital storage device (e.g., hard drive, network drive, cloud storage, RAM, etc.). One or more images may need to be annotated.
2. Add one or more preprocessing steps to one or more images. For example: noise reduction, contrast enhancement etc.
3. Split the dataset in validation and training.
4. Train the model.

For use in Extracting Diagnostic Information:
1. Receive one or more digital images of slides for a patient into a digital storage device (e.g., hard drive, network drive, cloud storage, RAM, etc.).
2. Run the trained semantic segmentation system on one or more slides to generate labeled cores/levels, artifacts, and/or background.
3. Attempt to register one or more cores/levels to determine which, if any, tissue (i.e. prostate core biopsy) regions belong to the same core at different levels.
4. Produce a count of the number of cores for one or more slides using the alignment. One or more predictions may be assigned a class score. By fixing a threshold for this class score, it may be possible to count the number of cores on a slide.
5. Produce a measurement of the medial axis estimation by using the prediction masks as an overlay for medial axis estimation procedures. A skeletonize function may be called over one or more masks to estimate the medial axis for one or more cores.

Example outputs of the synthetic slide generator are shown in FIG. 9. Output images may include synthetically generated core needle biopsy images generated by a prototype used for training, as shown.

Figure 10:
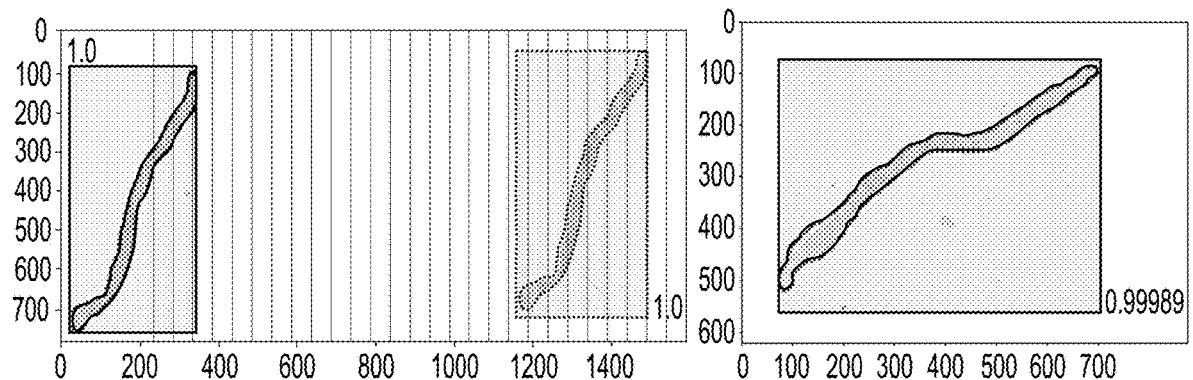
FIG. 10 illustrates exemplary predictions prepared from the segmentation of prostate core needle biopsies, according to an embodiment of the present disclosure.

FIG. 10 illustrates example predictions from the segmentation of prostate core needle biopsies. Each box may indicate the classification of an instance, which can include multiple segments represented by the contours surrounding the tissue contained within the box. The axes may represent pixel dimensions, although other metrics may be used. The numbers adjacent to the boxes surrounding the tissue segments may be corresponding instance classification scores, which may be omitted, and may be produced by an algorithm.

Figure 11:
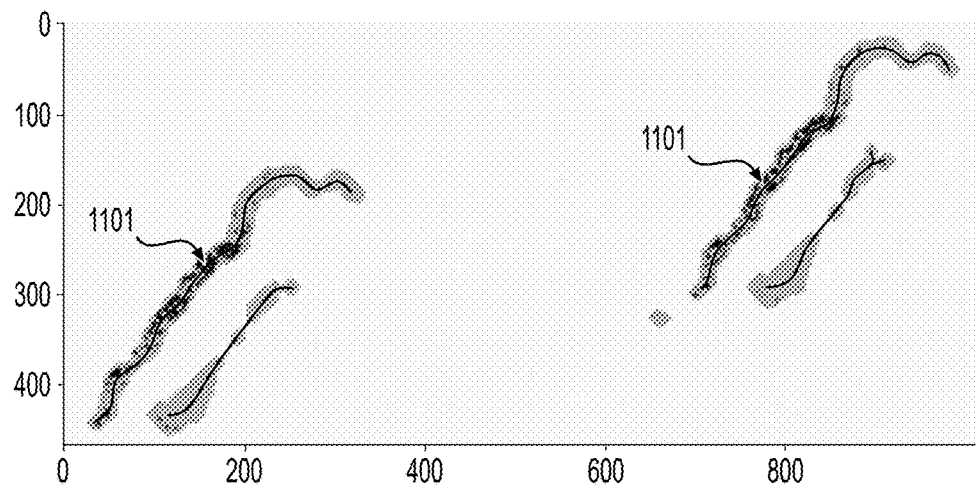
FIG. 11 illustrates an estimation of a medial axis of a core needle biopsy, according to an embodiment of the present disclosure.

FIG. 11 illustrates an estimation of the medial axis 1101 of an exemplary core needle biopsy image. When tissue fragments are properly assigned to the same core or sample, the medial axis can accurately represent the true length and quantification measures of the specimen, as illustrated in the bottom biopsy core.

Embodiment: Improved Visualization of Levels

Digital pathology may offer users, e.g., pathologists, new tools that enable them to more quickly identify features of interest. Using techniques presented herein, one may quickly see corresponding regions at multiple levels of the same piece of tissue. This may create efficiencies for clinical reporting of patient tissue.

Additional steps may include:
1. Receive one or more digital images of slides for a patient into a digital storage device (e.g., hard drive, network drive, cloud storage, RAM, etc.).
2. Run the training on one or more slides within the collection to identify N regions across one or more slides.
3. Match tissue regions to identify which ones belong to the same block at different levels. In computer vision, this may be known as solving the correspondence problem. There are multiple ways to solve this problem, including correlation-based methods and feature-based methods.

a. To use a correlation-based method for alignment, the pixels of one or more image regions are correlated to each other using correlation, normalized cross-correlation, or a similar technique. Pieces of tissue with correlation that surpasses a threshold are matched so that the corresponding pixel may be determined on one piece of tissue to the pixels on the other piece of tissue.

b. To use a feature-based method for alignment, first localized keypoints and their feature vectors are identified on one or more pieces of tissue. Keypoints describe distinct localized regions, such as corners, blobs, and/or other interest points. These may be computed using a variety of methods, including Scale-Invariant Feature Transform (SIFT), Oriented feature from accelerated segment test FAST and/or Rotated Binary Robust Independent Elementary Features (BRIEF) (ORB), Speeded Up Robust Features (SURF), CNN-based descriptors, blob detectors, Harris corner detector with HOG, etc. After identifying keypoint locations and features at one or more locations for one or more tissues in a slide or collection of slides, match one or more keypoints on each of them to each other to identify potential matches and to produce N match scores that identify how many similar points exist for one or more pieces of tissue compared to one or more other tissues. Matching may be done in a variety of ways, such as using the random sample consensus (RANSAC) method to fit a homography or other transformation between each tissue region, mapping the pixels from one piece of tissue to the other tissue using the homography and then assessing the error of the match based on pixel-wise differences. The match with the lowest error may be considered a match if the error is less than a threshold.

Figure 14:
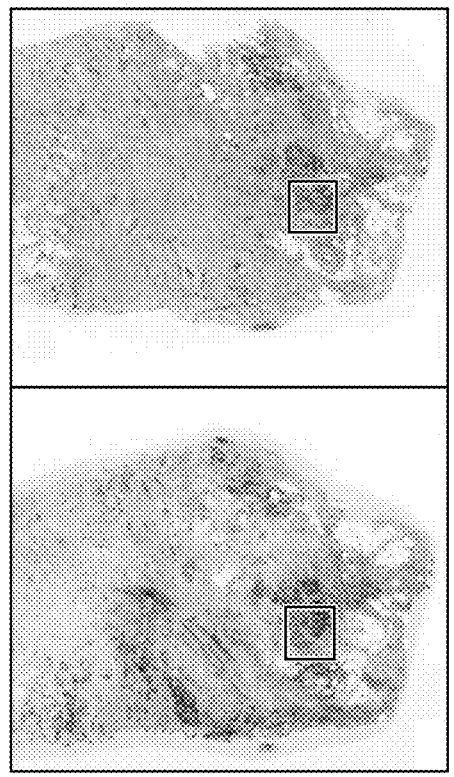
FIG. 14 illustrates a highlighted region on one slide and a corresponding region on an adjacent level on a different slide, according to techniques presented herein.

4. Using the alignment, users may visualize points on one piece of tissue on one or more corresponding levels as shown in FIG. 13 and FIG. 14.

5. Optionally, output the alignments to storage (e.g., cloud storage, hard drive, RAM, etc.)

Figure 12:
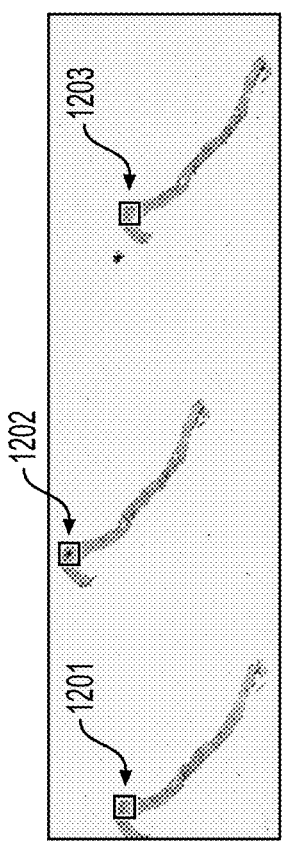
FIG. 12 is a visualization of a same geographic region across levels of the same tissue section biopsy on the same slide, according to techniques presented herein.

FIG. 12 illustrates an exemplary visualization of the same tissue section biopsy on the same slide. Using techniques presented herein, one embodiment enables visualization by users of the same geometric region across levels of the same tissue section biopsy on the same slide. When the user selects a region, such as by clicking in the center of the black box 1202, corresponding regions from different levels of the biopsy may automatically be highlighted, illustrated by black boxes 1201 and 1203, enabling them to quickly locate the same region of tissue at multiple levels of depth within the specimen.

Figure 13:
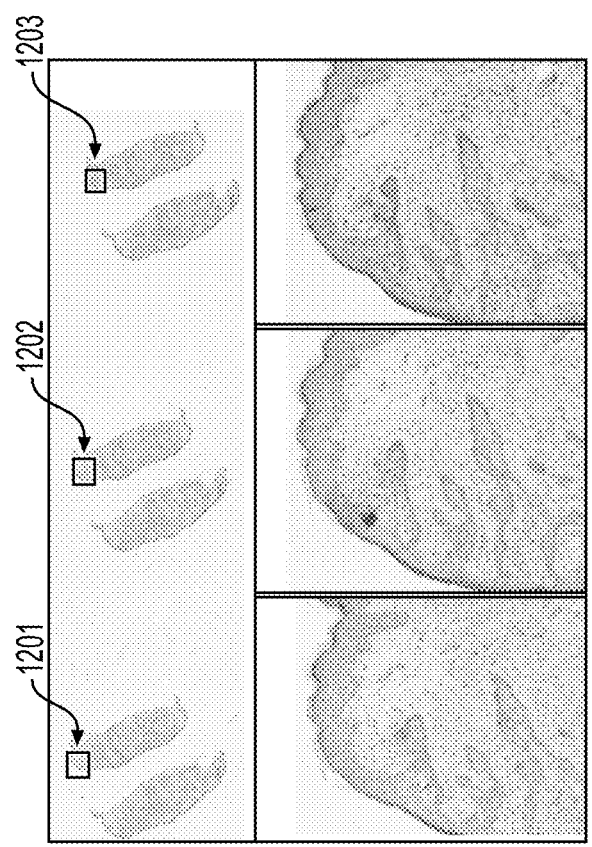
FIG. 13 is a visualization of a same geographic region across levels of the same tissue section biopsy on the same slide, according to techniques presented herein.

FIG. 13 illustrates an exemplary visualization of a geometric region across levels of the same tissue section biopsy on the same slide. Using techniques presented herein, one embodiment enables visualization by users of the same location across multiple level depths of the same tissue section biopsy on the same slide. When the user is looking within a given region, such as within the location indicated by the black box 1202, the corresponding locations in the other levels of the same core needle biopsy, illustrated by black boxes 1201 and 1203, may be highlighted along with magnified views of those regions, enabling the user to quickly inspect localized regions of the tissue at multiple depths.

FIG. 14 illustrates an exemplary highlighted region on one level with a corresponding region on an adjacent level.

Using techniques presented herein, the pathologist may highlight a region on one level and the corresponding region on an adjacent level may be highlighted and reviewed in a co-registered fashion which may be on the same, or on different slides (as shown in the above image).

Figure 15:
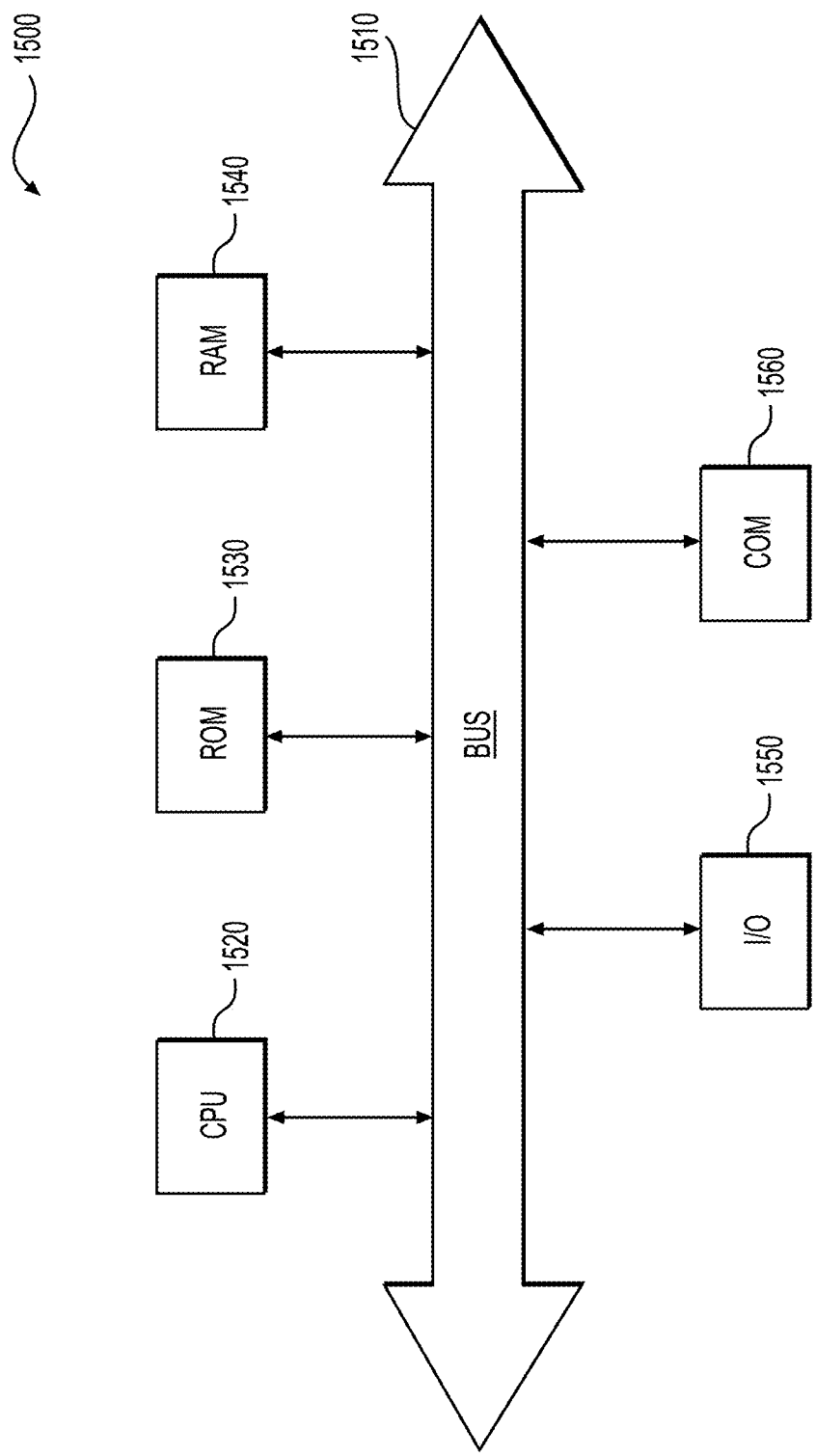
FIG. 15 depicts an exemplary system that may execute techniques presented herein.

As shown in FIG. 15, device 1500 may include a central processing unit (CPU) 1520. CPU 1520 may be any type of processor device including, for example, any type of special purpose or a general-purpose microprocessor device. As will be appreciated by persons skilled in the relevant art, CPU 1520 also may be a single processor in a multi-core/multi-processor system, such system operating alone, or in a cluster of computing devices operating in a cluster or server farm. CPU 1520 may be connected to a data communication infrastructure 1510, for example a bus, message queue, network, or multi-core message-passing scheme.

Device 1500 may also include a main memory 1540, for example, random access memory (RAM), and also may include a secondary memory 1530. Secondary memory 1530, e.g. a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1530 may include similar means for allowing computer programs or other instructions to be loaded into device 1500. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 1500.

Device 1500 also may include a communications interface ("COM") 1560. Communications interface 1560 allows software and data to be transferred between device 1500 and external devices. Communications interface 1560 may include a modem, a network interface (such as an Ethernet card), a communications port, a PCMCIA slot and card, or the like. Software and data transferred via communications interface 1560 may be in the form of signals, which may be electronic, electromagnetic, optical or other signals capable of being received by communications interface 1560. These signals may be provided to communications interface 1560 via a communications path of device 1500, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 1500 may also include input and output ports 1550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically may be grouped together to perform a function or group of related functions. Like reference numerals are generally intended to refer to the same or similar components. Components and/or modules may be implemented in software, hardware, or a combination of software and/or hardware.

The tools, modules, and/or functions described above may be performed by one or more processors. "Storage" type media may include any or all of the tangible memory of the computers, processors or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

The foregoing general description is exemplary and explanatory only, and not restrictive of the disclosure. Other embodiments may be apparent to those skilled in the art from consideration of the specification and practice of the invention disclosed herein. It is intended that the specification and examples be considered as exemplary only.

What is claimed is:

1. A computer-implemented method of training a machine learning model to identify previously conjoined pieces of tissue in a specimen using a synthetic dataset, comprising:
    receiving a plurality of digital images associated with a plurality of pathology specimens, at least a portion of the plurality of digital images comprising images of previously conjoined pieces of tissue;
    generating a synthetic dataset based on the plurality of digital images;
    training a panoptic or instance segmentation model based on the plurality of digital images and the synthetic dataset; and
    outputting the panoptic or instance segmentation model to at least one digital storage device, wherein generating the synthetic dataset further comprises:
        generating a bank of tissue cores based on the plurality of digital images, the plurality of digital images including one or more annotated digital images;
        generating an empty synthetic slide by sampling background or selecting a fixed background color from the one or more annotated digital images;
        randomly placing and/or rotating one or more tissue cores and corresponding tissue mask from the bank of tissue cores onto the empty synthetic slide; and
        placing the empty synthetic slide with one or more tissue cores and corresponding tissue mask on an array.

2. The computer-implemented method of claim 1, wherein generating the synthetic dataset further comprises:
    generating at least one slide background for images associated with the synthetic dataset;
    embedding one or more artifact and/or floater for at least one of the images associated with the synthetic dataset; and
    embedding one or more levels and/or cores for at least one of the images associated with the synthetic dataset.

3. The computer-implemented method of claim 2, wherein the synthetic dataset comprises at least one annotation.

4. The computer-implemented method of claim 1, wherein each annotated digital image comprises at least one annotation, and each annotation takes a form of a polygon that segments a distinct region of tissue of the pathology specimen, and
    the method further comprising:
        determining a tissue mask based on each polygon, each tissue mask segmenting tissue from a background;
        converting the corresponding tissue mask into a single annotation mask for an entirety of the empty synthetic slide to generate a synthetic digital image;
        outputting the synthetic digital image and the at least one annotation; and
        saving the synthetic digital image and the at least one annotation to a digital storage device.

5. The computer-implemented method of claim 1, further comprising adding random noise to the array.

6. The computer-implemented method of claim 1, further comprising:
    running the panoptic or instance segmentation model on a region of interest in a pathology specimen to generate a report; and
    outputting the report to a digital storage device and/or display.

7. The computer-implemented method of claim 6, wherein the report comprises at least one of an identification of a specimen type, an association of two or more tissue fragments that belong together, and/or a correspondence of two or more sectioned levels of the pathology specimen.

8. The computer-implemented method of claim 1, further comprising:
    running the panoptic or instance segmentation model on one or more digital pathology slides to generate at least one of one or more labeled tissue cores and/or levels, one or more artifacts, and/or a background; and
    determining whether any tissue regions of the digital pathology slides belong to a similar core at a different level.

9. The computer-implemented method of claim 1, further comprising:
    running the panoptic or instance segmentation model on one or more digital pathology slides to identify one or more tissue regions across the one or more digital pathology slides;
    matching the one or more tissue regions as belonging to a similar tissue block at a different level; and
    outputting at least one matching tissue regions to a digital storage.

10. The computer-implemented method of claim 9, where matching the one or more tissues regions comprises using a correlation-based method.

11. The computer-implemented method of claim 9, where matching the one or more tissue regions comprises using a feature-based method.

12. A system for training a machine learning model to identify previously conjoined pieces of tissue in a specimen using a synthetic dataset, the system comprising:
    at least one memory storing instructions; and
    at least one processor configured to execute the instructions to perform operations comprising:
        receiving a plurality of digital images associated with a plurality of pathology specimens, at least a portion of the plurality of digital images comprising images of previously conjoined pieces of tissue;

generating a synthetic dataset based on the plurality of digital images;

training a panoptic or instance segmentation model based on the plurality of digital images and the synthetic dataset; and outputting the panoptic or instance segmentation model to at least one digital storage device, wherein generating the synthetic dataset further comprises:

generating a bank of tissue cores based on the plurality of digital images, the plurality of digital images including one or more annotated digital images;

generating an empty synthetic slide by sampling background or selecting a fixed background color from the one or more annotated digital images;

randomly placing and/or rotating one or more tissue cores and corresponding tissue mask from the bank of tissue cores onto the empty synthetic slide; and placing the empty synthetic slide with one or more tissue cores and corresponding tissue mask on an array.

13. The system of claim 12, wherein generating the synthetic dataset further comprises:

generating at least one slide background for images associated with the synthetic dataset;

embedding one or more artifact and/or floater for at least one of the images associated with the synthetic dataset; and embedding one or more levels and/or cores for at least one of the images associated with the synthetic dataset.

14. The system of claim 12, wherein each annotated digital image comprises at least one annotation, and each annotation takes a form of a polygon that segments a distinct region of tissue of the pathology specimen, and wherein the operations further comprise:

determining a tissue mask based on each polygon, each tissue mask segmenting tissue from a background;

converting the corresponding tissue mask into a single annotation mask for an entirety of the empty synthetic slide to generate a synthetic digital image;

outputting the synthetic digital image and the at least one annotation; and saving the synthetic digital image and the at least one annotation to a digital storage device.

15. The system of claim 12, wherein the operations further comprise:

running the panoptic or instance segmentation model on a region of interest in a pathology specimen to generate a report; and outputting the report to a digital storage device and/or display.

16. The system of claim 15, wherein the report comprises at least one of an identification of a specimen type, an association of two or more tissue fragments that belong together, and/or a correspondence of two or more sectioned levels of the pathology specimen.

17. The system of claim 12, wherein the operations further comprise:

running the panoptic or instance segmentation model on one or more digital pathology slides to identify one or more tissue regions across the one or more digital pathology slides;

matching the one or more tissue regions as belonging to a similar tissue block at a different level; and outputting at least one matching tissue regions to a digital storage.

18. The system of claim 17, where matching the one or more tissues regions comprises using a correlation-based method.

19. A non-transitory machine-readable medium storing instructions that, when executed by a computing system, causes the computing system to perform a method of training a machine learning model to identify previously conjoined pieces of tissue in a specimen using a synthetic dataset, the method including:

receiving a plurality of digital images associated with a plurality of pathology specimens, at least a portion of the plurality of digital images comprising images of previously conjoined pieces of tissue;

generating a synthetic dataset based on the plurality of digital images;

training a panoptic or instance segmentation model based on the plurality of digital images and the synthetic dataset; and outputting the panoptic or instance segmentation model to at least one digital storage device, wherein generating the synthetic dataset further comprises:

generating a bank of tissue cores based on the plurality of digital images, the plurality of digital images including one or more annotated digital images;

generating an empty synthetic slide by sampling background or selecting a fixed background color from the one or more annotated digital images;

randomly placing and/or rotating one or more tissue cores and corresponding tissue mask from the bank of tissue cores onto the empty synthetic slide; and placing the empty synthetic slide with one or more tissue cores and corresponding tissue mask on an array.

20. The non-transitory machine-readable medium of claim 19, wherein each annotated digital image comprises at least one annotation, and each annotation takes a form of a polygon that segments a distinct region of tissue of the pathology specimen, and wherein the method further comprises:

determining a tissue mask based on each polygon, each tissue mask segmenting tissue from a background;

converting the corresponding tissue mask into a single annotation mask for an entirety of the empty synthetic slide to generate a synthetic digital image;

outputting the synthetic digital image and the at least one annotation; and saving the synthetic digital image and the at least one annotation to a digital storage device.

* * * * *